May 19, 1925.  
E. WILSON  
OIL SEPARATOR  
Original Filed March 12, 1923

1,538,150

Inventor:
Edward Wilson,
His Attorneys.

Patented May 19, 1925.

1,538,150

UNITED STATES PATENT OFFICE.

EDWARD WILSON, OF ST. LOUIS, MISSOURI, ASSIGNOR TO WILSON ENGINEERING COMPANY, OF ST. LOUIS, MISSOURI, A CORPORATION OF MISSOURI.

OIL SEPARATOR.

Application filed March 12, 1923, Serial No. 624,589. Renewed April 8, 1925.

*To all whom it may concern:*

Be it known that I, EDWARD WILSON, a citizen of the United States, residing at St. Louis, Missouri, have invented a new and useful Oil Separator, of which the following is a specification.

This invention relates to oil separators, and an object of the invention is to provide a separator for separating the atomized oil from compressed gas.

Figure 1:
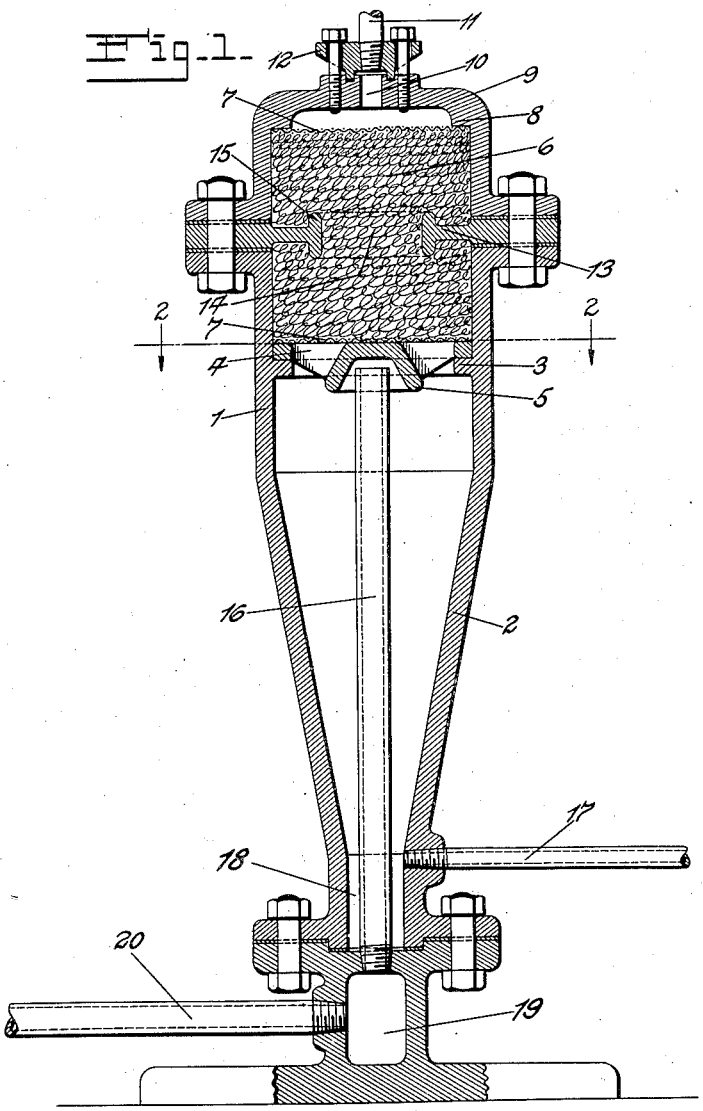

In the drawings Fig. 1 is a sectional view of an efficient embodiment of the invention.

Figure 2:
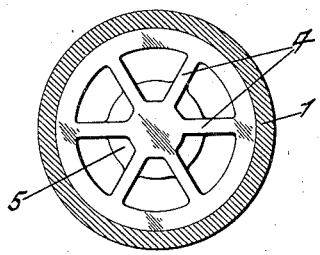

Fig. 2 is a cross sectional view on the line 2—2 of Fig. 1.

In the embodiment shown the lower portion of the casing comprises a relatively large upper portion 1 and a downwardly tapered lower portion 2. An internal flange 3 supports a grid 4 having an inverted cup-shaped portion 5. A filter chamber is provided above the grid 4 and is filled with filtering material 6 such, for instance, as a pad of cotton waste. The filtering material is confined between two heavy wire screens 7, the lower screen resting upon the grid 4 and the upper screen being pressed down by a shoulder 8 on the cover plate 9. An open space is above the upper screen 7 inside the cover plate to receive the gas and the atomized oil carried with it. The cover plate 9 has an inlet opening 10 in line with the open end of an inlet pipe 11 attached to an opening through a fitting block 12 having rigid and hermetic connection with the cover plate.

A baffle to prevent creeping of the gas and vapor along the wall of the filter chamber comprises a plate 13 clamped between the cap 9 and the upper end of the part 1 of the casing and provided with a central hole 14. The hole 14 is spaced some distance from the wall of the filter chamber and is surrounded by vertical flanges 15 which hold the filtering material against the walls of the filtering chamber. The portion of the baffle within the filter chamber is embedded within the filtering material 6.

A pipe 16 opening through the bottom wall of the lower chamber in the casing has its open upper end terminating within the inverted cup 5 and constitutes a passage for conducting the gas out of the condenser while the oil is taken out through another pipe 17. The pipe 17 leads from a portion 18 of the chamber that is considerably restricted in volume. The open upper end of the pipe 16 is above the level to which the oil rises in the oil reservoir in the lower portion of the casing. The inverted cup 5 serves to deflect the oil passing through the filter and to prevent the oil from entering the gas outlet pipe 16. The pipe 16 opens into a chamber 19 from which a pipe 20 leads to an air or ammonia receiver (not shown).

The filtering material, through which the gas passes, becomes saturated with oil and constitutes an effective means of condensing the oil vapor into drops which descend into the oil reservoir in the lower part of the casing, while the gas from which the oil was freed passes out through the open pipe 16. The device is highly efficient and satisfactory for its intended purposes and may be modified within equivalent limits without departure from the nature of the invention.

The embodiment of the invention shown is especially adapted, though not restricted, for use in connection with an ammonia compressor. Due to the fact that oil absorbs large quantities of ammonia and that the amount of the ammonia absorbed is directly proportional to the pressure of the gas, it is evident that when the gas pressure is lowered the tendency of the ammonia will be to boil out the oil. Due to the viscous nature of the oil it has a tendency to foam during this action and to occupy a volume very much greater than the normal volume of the oil. If provision were not made to counteract or overcome this condition the foaming oil would rise in the lower chamber of the casing and overflow into the gas outlet 16 thus defeating the purpose of the device. As before stated, the lower end 18 of the lower chamber in the casing is considerably restricted in volume, and the oil level is automatically maintained in the plane of the opening into the oil outlet pipe 17. The restricted volume of the oil is such that when completely converted to foam it cannot possibly fill the chamber 2 to the point of overflowing into the discharge pipe 16.

I do not restrict myself unessentially, but what I claim and desire to secure by Letters Patent is:—

1. An oil separator, comprising a filtering chamber, a compressed fibrous filter in the filtering chamber, a baffle device extending into the filtering chamber, an oil reservoir below the filtering chamber, a pipe extending some distance into the oil reservoir, and means within the oil reservoir preventing oil from entering said pipe.

2. An oil separator comprising a housing including a relatively large upper portion, a relatively small lower portion, and a downwardly tapering intermediate portion connecting the upper and lower portions; a filter of fibrous material in the upper portion of the housing; sections of screen against the upper and lower ends of the filter comprising the filter between them and against the walls of the housing; a vacant chamber above the filter for receiving gas and entrained atomized oil for passage through the filter; a pipe extending upwardly to the lower and intermediate portions of the housing for conducting gas therefrom; and means for preventing oil from entering said pipe.

3. An oil separator comprising a housing composed of an imperforate cylindrical upper wall portion a downwardly tapered intermediate wall portion and a cylindrical lower portion; a pair of horizontal screens in spaced relationship in the cylindrical upper portion of said housing, a filter of fibrous material compressed between said screens and against the imperforate wall of the housing, a vacant chamber in the housing above the filter, and pipes for conducting the gas and the oil from the housing.

4. An oil separator comprising a housing composed of an imperforate cylindrical upper wall portion and a downwardly tapered lower wall portion, a pair of horizontal screens in spaced relationship in the cylindrical upper portion of said housing, a filter of fibrous material compressed between said screens and against the imperforate wall of the housing, a vacant chamber in the housing above the filter, a pipe extending upwardly into the lower portion of said housing and having its open upper end below said filter for conducting gas from the housing, and a pipe opening into the lower end of the housing for conducting oil therefrom.

5. An oil separator, comprising a casing, filtering material in one end of the casing, means for holding the filtering material pressed against the side walls of the casing, an oil reservoir below the filtering material for receiving oil passing through the filtering material, a pipe for conducting gas from the oil reservoir, and a pipe for conducting oil from the oil reservoir.

6. An oil separator, comprising a casing having an oil reservoir in the lower end thereof, filtering material above the oil reservoir, screens confining the filtering material between them, means between said screens for holding the filtering material in contact with the side walls of the casing, a pipe in the oil reservoir extending toward the filtering material for conducting gas from the casing, a device between the end of said pipe and the filtering material preventing oil from entering said pipe, and a pipe for conducting oil from said oil reservoir.

7. An oil separator, comprising a casing having an oil reservoir in the lower end thereof, filtering material above the oil reservoir, screens confining the filtering material between them, means between said screens for holding the filtering material in contact with the side walls of the casing, a pipe in the oil reservoir extending toward the filtering material for conducting gas from the casing, and a pipe for conducting oil from said oil reservoir.

8. An oil separator, comprising a downwardly tapered casing, an oil receiving portion of relatively restricted volume in the bottom of said casing, a pipe opening into said oil receiving portion, filtering material in the opposite end of said casing, a pipe opening through one wall of the casing for conducting gas therefrom, an element between the open end of said pipe and said filtering material for preventing oil from entering said last-named pipe, and means for holding the filtering material pressed against the side walls of the casing.

9. An oil separator, comprising a casing having an oil reservoir in the lower end thereof, filtering material in the casing above the oil reservoir, a pipe for conducting gas into the casing at the side of the filtering material opposite from the oil reservoir, a baffle for preventing the gas from passing between the filtering material and the wall of the casing to the oil reservoir, and a pipe for conducting the gas from the oil reservoir.

10. An oil separator, comprising a casing having an oil reservoir in the lower end thereof, filtering material in the casing above the oil reservoir, means for holding the filtering material compressed, a pipe for conducting the gas into the casing at the side of the filtering material opposite from the oil reservoir, a baffle for preventing the gas from passing between the filtering material and the wall of the casing to the oil reservoir, and a pipe for conducting the gas from the oil reservoir.

11. An oil separator, comprising a casing having an oil reservoir in the lower end thereof, filtering material in the casing above the oil reservoir, a pipe for conducting gas into the casing at the side of the filtering material opposite from the oil reservoir, a baffle for preventing the gas from passing between the filtering material and the wall of the casing to the oil reservoir, a pipe for conducting the gas from the oil reservoir, and means for preventing the oil in the oil reservoir from entering said pipe.

12. An oil separator, comprising a casing having an oil reservoir in the lower end thereof, filtering material in the casing above the oil reservoir, means for holding the filtering material compressed, a pipe for conducting the gas into the casing at the side of the filtering material opposite from the oil reservoir, a baffle for preventing the gas from passing between the filtering material and the wall of the casing to the oil reservoir, a pipe for conducting the gas from the oil reservoir, and means for preventing the oil in the oil reservoir from entering said pipe.

13. An oil separator, comprising a downwardly tapered casing, an oil receiving portion of relatively restricted volume in the power end of said casing, filtering material in the opposite end of said casing, means for admitting gas into the casing at the side of the filtering material opposite from the oil reservoir, means for holding the filtering material compressed, a baffle for preventing the gas from passing to the oil reservoir between the filtering material and the wall of the casing, separate pipes for conducting gas and oil from the oil reservoir, and means for preventing oil from entering the pipe that conducts the gas from the oil reservoir.

EDWARD WILSON.